(12) United States Patent
Hanna

(10) Patent No.: US 6,804,411 B1
(45) Date of Patent: Oct. 12, 2004

(54) METHOD, SYSTEM, AND PROGRAM FOR DECOMPRESSING AND ALIGNING LINE WORK DATA FROM MULTIPLE OBJECTS

(75) Inventor: Stephen Dale Hanna, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,632

(22) Filed: May 15, 2000

(51) Int. Cl.$^7$ ................................................. G06K 9/36
(52) U.S. Cl. ....................... 382/276; 382/233; 358/1.15
(58) Field of Search .................................. 382/276, 317, 382/232, 162, 254, 233, 166, 204, 239, 318; 348/502, 745, 625, 557, 630, 675; 375/240.4; 345/502, 501, 545; 365/189.04; 358/1.15, 1.9, 1.16, 1.18, 502, 500, 539

(56) References Cited

U.S. PATENT DOCUMENTS

| | | |
|---|---|---|
| 3,961,750 A | 6/1976 | Dao |
| 4,125,873 A | 11/1978 | Chesarek |
| 4,484,187 A | 11/1984 | Brown et al. |
| 4,570,233 A | 2/1986 | Yan et al. |
| 4,642,676 A | 2/1987 | Weinger |
| 4,675,666 A | 6/1987 | Peterson |
| 4,700,181 A | 10/1987 | Maine et al. |
| 4,918,626 A | 4/1990 | Watkins et al. |
| 4,924,414 A | 5/1990 | Ueda |
| 4,951,229 A | 8/1990 | DiNicola et al. |
| 5,058,040 A | 10/1991 | Tajima |
| 5,359,432 A | 10/1994 | Peltzer et al. |
| 5,454,071 A | 9/1995 | Siverbrook et al. |
| 5,477,543 A | 12/1995 | Purcell |
| 5,542,031 A * | 7/1996 | Douglass et al. ........... 395/114 |
| 5,621,869 A | 4/1997 | Drews |
| 5,732,248 A | 3/1998 | Prouty et al. |
| 5,751,291 A | 5/1998 | Olsen et al. |
| 5,754,180 A | 5/1998 | Kivolowitz et al. |
| 5,760,780 A | 6/1998 | Larson et al. |
| 5,781,197 A | 7/1998 | Saunders |
| 5,825,692 A * | 10/1998 | Baumgartner et al. . 365/189.04 |
| 5,835,095 A | 11/1998 | Smith et al. |
| 5,844,828 A | 12/1998 | Fujimura et al. |
| 5,852,711 A * | 12/1998 | Campbell ................... 358/1.18 |

(List continued on next page.)

FOREIGN PATENT DOCUMENTS

| | | |
|---|---|---|
| EP | 0886205 | 12/1998 |
| EP | 0886208 | 12/1998 |
| EP | 0886235 | 12/1998 |
| EP | 0886435 | 12/1998 |
| JP | 421077 | 4/1992 |

OTHER PUBLICATIONS

U.S. patent application Ser. No. 09/570,752, filed May 15, 2000, entitled "Method, System, and Logic for Selecting Pixel Data from Multiple Objects".

(List continued on next page.)

Primary Examiner—Bravesh M. Mehta
Assistant Examiner—Seyed Azarian
(74) Attorney, Agent, or Firm—David J. Victor; Konrad Raynes & Victor LLP

(57) ABSTRACT

Disclosed is a method, system, and program for receiving line work data and control data for pixels on a sheet from objects. The control data for one pixel indicates whether to use the line work color data for the pixel or contone raster object for the pixel. Further, multiple objects may provide line work data and control data for a same pixel. Line work and control data are simultaneously decompressed for a same set of pixels from the multiple objects and decompressed line work and control data are simultaneously aligned for a same set of pixels from the multiple objects. The simultaneously aligned line work and control data for the pixel from the multiple objects are buffered in a third buffer.

67 Claims, 9 Drawing Sheets

U.S. PATENT DOCUMENTS

| | | | |
|---|---|---|---|
| 5,852,742 | A | 12/1998 | Vondran, Jr. et al. |
| 5,857,035 | A | 1/1999 | Rust |
| 5,948,050 | A | 9/1999 | Diamondstein et al. |
| 5,949,909 | A | 9/1999 | Kao et al. |
| 5,960,115 | A | 9/1999 | Kao et al. |
| 5,966,504 | A * | 10/1999 | Sity ............................ 395/109 |
| 6,006,244 | A | 12/1999 | Mahurin |
| 6,049,390 | A * | 4/2000 | Notredame et al. ........ 358/1.15 |
| 6,285,458 | B1 * | 9/2001 | Yada .......................... 358/1.15 |

OTHER PUBLICATIONS

U.S. patent application Ser. No. 09/571,701, filed May 15, 2000, entitled "Method, System, and Logic Using Multiplexers to Select Data for Pixels from Multiple Objects".

U.S. patent application Ser. No. 09/569,777, filed May 12, 2000, entitled "Method, System, Program, and Data Structure for Generating Raster Objects".

U.S. patent application Ser. No. 09/570,211, filed May 12, 2000, entitled Method, System, and Logic for Selecting Line Work and Control Data for a Pixel from Multiple Objects of Line Work Data Provided for the Pixel.

U.S. patent application Ser. No. 09/571,668, filed May 15, 2000, entitled "Method and Apparatus for Shifting Data from Registers".

* cited by examiner

METHOD, SYSTEM, AND PROGRAM FOR DECOMPRESSING AND ALIGNING LINE WORK DATA FROM MULTIPLE OBJECTS

CROSS-REFERENCE TO RELATED APPLICATIONS

This application is related to the following co-pending and commonly-assigned patent applications, and all of which are incorporation herein by reference in their entirety:

"Method And Apparatus For Shifting Selecting Data From Registers", to Stephen D. Hanna, having application Ser. No. 09/571,668, filed on the same date herewith;

"Method, System, Program, And Data Structure for Generating Raster Objects", to Jean M. Aschenbrenner, Christopher Kush, and John Varga, having application Ser. No. 09/569,777;

"Method, System, And Logic For Selecting Line Work And Control Data For a Pixel From Multiple Objects Of Line Work Data Provided For The Pixel", to David E. Finlay and Phillip K. Hoskins, having, application Ser. No. 09/570,211;

"Method, System, And Logic Using Multiplexers to Select Data For Pixels From Multiple Objects", to Stephen D. Hanna, having application Ser. No. 09/571,701, filed on the same date herewith; and "Method, System, and Logic for Selecting Pixel Data from Multiple Objects", Jean M. Aschenbrenner, Stephen D. Hanna, and Charles H. Morris III, having application Ser. No. 09/570,752, filed on the same date herewith.

BACKGROUND OF THE INVENTION

1. Field of the Invention

The present invention relates to a method, system and logic for decompressing and aligning line work data.

2. Description of the Related Art

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bit maps are generated for each print head. The print heads overlay the images defined by their respective bit maps onto the print medium.

To produce the bit maps for the print heads, the raster image processor performs numerous transformations on a print image, which may include different types of data, such as line art, e.g., text and graphics, and continuous tone (contone), e.g., images. The raster image processor usually performs operations such as data compression, color space conversion, and halftoning when generating the raster bit map to print. After dissecting a print image into different components, such as color components, text art, contone, images, etc., the raster image processor must then merge the different elements together so that the original image, previously split into different components, is reconstructed for the color plane process.

As newer printers print at ever higher resolutions and speeds, the amount of data needed to generate the print job correspondingly increases. One of the major limitations in increasing printer speed is the time required to rasterize print data, especially the time required by the raster image processor to break an image into different object components and then reassemble, screen and merge those components into a final bitmap image.

Thus, there is a need in the art to provide an improved method, system, and program to transform print data, such as text, vector graphics, images and raster data into a final rasterized bit maps in a more timely manner to increase printer throughput.

SUMMARY OF THE PREFERRED EMBODIMENTS

To overcome the limitations in the prior art described above, preferred embodiments disclose a method, system, and logic for receiving line work data and control data for pixels on a sheet from objects. The control data for one pixel indicates whether to use the line work color data for the pixel or contone raster object for the pixel. Further, multiple objects may provide line work data and control data for a same pixel. Line work and control data are simultaneously decompressed for a same set of pixels from the multiple objects and decompressed line work and control data are simultaneously aligned for a same set of pixels from the multiple objects. The simultaneously aligned line work and control data for the pixel from the multiple objects are buffered in a third buffer.

In further embodiments, line work and control data for multiple pixels from one object are simultaneously buffered in a decompression buffer. The line work and control data to decompress are accessed from the decompression buffer after sending the decompressed line work and control data to aligning logic.

In still further embodiments, the line work and control data for four pixels are buffered in aligning logic buffer to be aligned if the pixel position of the line work and control data for the first pixel of the four pixels is the same as a requested pixel position.

Still further, the control data from one object for a pixel can further indicate to not use either line work or contone data for the pixel. In such case, data indicating a clipping region is loaded. Before aligning the line work and control data for the pixel, the control data for one pixel in the aligning logic buffer is set to indicate to not use either line work or contone data for the pixel if the location of the pixel is within the clipping region.

Preferred embodiments provide hardware logic capable of simultaneously decompressing and aligning pixel data for a pixel location from multiple objects. This aligned pixel data from the multiple locations is then further processed to select line work and control data to use for the pixel from one of the multiple objects. Further, with the preferred embodiments, buffers are provided to buffer line work data at different stages so data is always available to the line work decompressor and aligner logic when one decompression or alignment operation completes. This allows the decompressor and aligner logic to operate concurrently on line work and control data for different sets of pixels.

With the hardware logic of the preferred embodiments, decompression, alignment, merging, and screening operations are offloaded to an external hardware card or processor thereby relieving the raster image processor of substantial processing burdens. This relief provided to the raster image processor improves the performance of the raster generation process and ultimately improves print speed by allowing final output raster data to be fed at a faster rate to the printer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
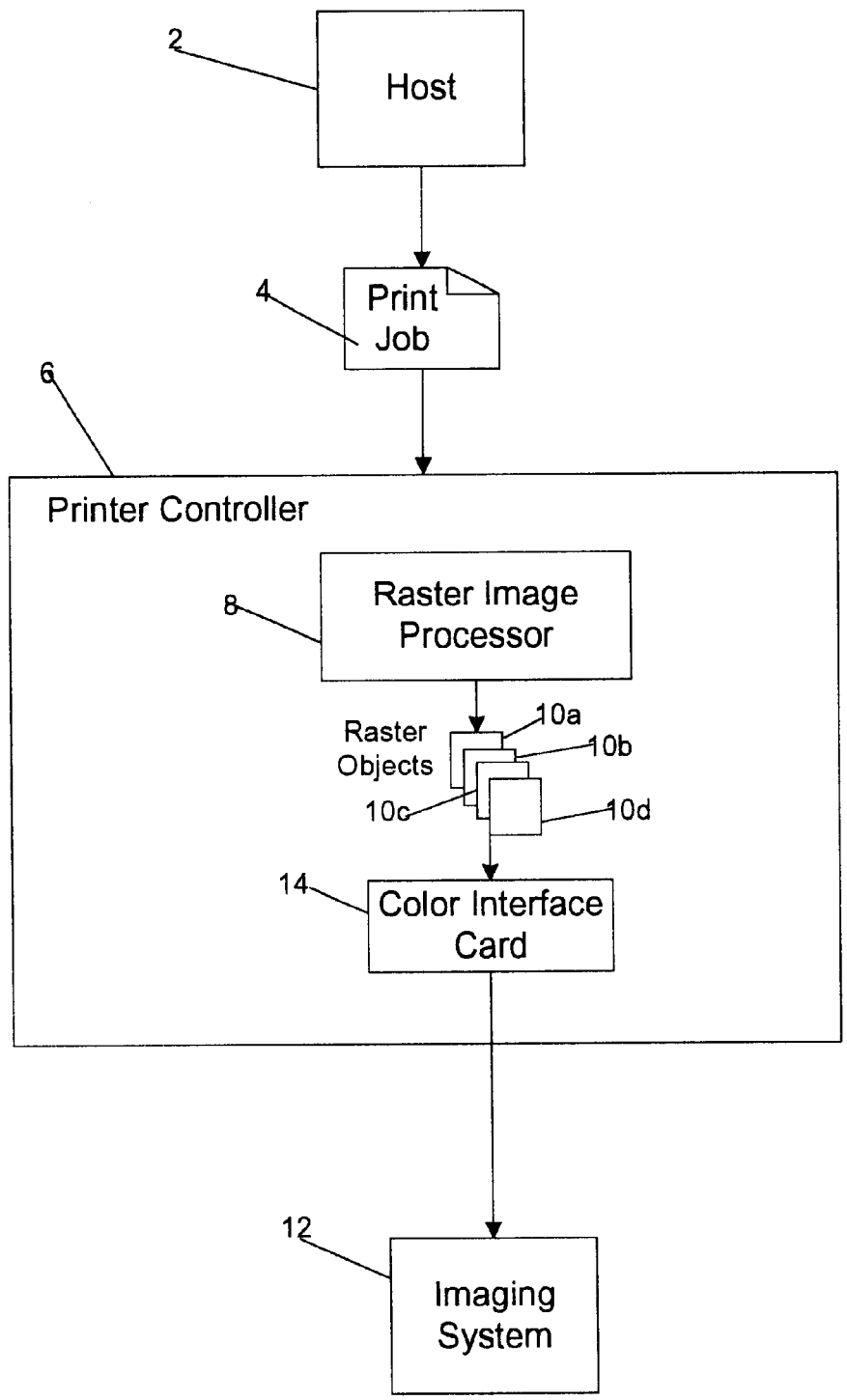
FIG. 1 illustrates a printing architecture in accordance with preferred embodiments of the present invention.

FIG. 1 illustrates a printing environment in which preferred embodiments are implemented. A host computer 2 generates a print job 4 that may include image (contone) and line work (text or graphics) components. The host 2 transmits the print job 4 to a printer controller 6 over a cable or network transmission line. The printer controller 6 may comprise a standalone processor or computer, such as the IBM RS/6000 processor. The printer controller 6 includes a raster image processor 8, that is preferably implemented in the RS/6000 main processor and accompanying firmware. In preferred embodiments, the raster image processor 8 generates raster objects 10a, b, c, d including the raster data. Each raster object 10a, b, c, d includes pixel information for one color component of the imaging system 12. For instance, if the imaging system 12 prints Cyan (C), Magenta (M), Yellow (Y) and black (K), then there would be one raster object for each color component for a scan line to print. Further, there may be separate raster objects 10a, b, c, d for line art and contone (images), thus providing 8 separate raster objects for each color component of a scan line for the line art and contone components of the line. The printer controller 6 and imaging system 12 components may be implemented in the same large scale printer, such as the International Business Machines (IBM) Corporation's Infoprint color printers, or with a separate server and standalone printer communicating over a network or attached directly using a serial or parallel port.

**RS/6000 and Infoprint are registered trademarks of International Business Machines Corporation.

Preferred embodiments include a color interface card (CIC) 14 that is preferably implemented on a hardware card, such as a PCI card using Field Programmable Gate Array (FPGA) logic. The CIC card 14 may be inserted PCI slot of the backplane of the printer controller 6. The CIC card 14 performs further processing of the raster objects 10 before they are sent to the imaging system 12 for printing.

In certain implementations, one CIC card 14 is capable of producing print data for two of the color planes. In such case, two CIC cards are needed to generate the final raster for the output device for all four color planes. In duplex implementations where the printer prints on both sides of a sheet concurrently, four CIC cards would be used, two for each side of the sheet to concurrently generate raster data for the print heads printing to both sides.

The Raster Objects Used by the CIC Card

The raster image processor 8 encodes the line work and contone objects with header information that enables the CIC card 14 logic to combine multiple line work and contone objects per scan line into final print output. In this way, many of the raster processing operations can be off-loaded to a separate hardware card (e.g., the CIC card 14), thereby relieving the raster image processor 8 of many of the processor intensive raster operations. This in turn substantially increases the ultimate printer speed and performance because the final raster output data used by the printer (or other output device) is generated faster by offloading many of the raster processing operations to dedicated hardware logic implemented in the CIC card 14.

In described implementations, the raster image processor 8 is capable of generating four line work (LW) and four contone (CT) objects per scan line per color plane, i.e., a total of 32 objects. This limitation on the number of line work and contone objects per scan line is due to the capabilities of the CIC card. In described implementations, the CIC card 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC card 14 hardware limitations. If the CIC card 14 was capable of handling more or less line work or contone objects per scan line, i.e., n objects, then the raster image processor 8 would have to merge input print data objects to ensure that there are no more than n line work or contone objects per scan line.

The raster image processor 8 will generate contone objects that provide eight bits per pel for contone (CT) color data and line work objects that provide eight bits per pel for the line work (LW) color data. The raster image processor 8 further generates two line work control (LWC) bits for each pixel in the line work object. The line work control (LWC) bits can be encoded with one of three values, select line work (LW), select contone (CT) or transparent. Select line work (LW) instructs the CIC card 14 to use the pixel data in the line work object over data for the pixel in any other line work object or contone object. Select contone (CT) instructs the CIC card 14 to use the pixel data in the highest priority contone (CT) object over data for the pixel in any line work (LW) object, and transparent instructs the CIC card 14 to consider the line work control (LWC) bits in the next highest priority line work control object, i.e., the pixel is transparent and the next lower order line work data should be considered to determine whether it is non-transparent and used.

The raster image processor 8 will further generate header data for each line work and contone object for use by the CIC card 14. Following are the fields encoded in the line work and contone headers for each object.

Sequence Number: The raster objects for each color may then be numbered consecutively starting from zero for the raster (proxy) object at the top of the sheet. This new number is the sequence number. The sequence number is reset to zero for each color for the first object on the next sheet. Thus, raster objects are to be printed on a sheet according to the ordering of their sequence numbers. In preferred implementations, the maximum sequence number is fifteen. After reaching fifteen, the sequence number starts over at zero. The sequence number is used to determine whether raster objects are received in the correct order.

Object Type: Indicates whether an object is the first raster object on a sheet, a last object or a next object, which is any object between the first and last raster object. The object type would also indicate whether the object is the last raster object for the entire print job and whether a blank page is to be printed. In preferred embodiments, the object type is represented by a five bit code, where the first bit indicates that the raster object is the first object on the sheet; the second bit indicates that the raster object is a next object, i.e., following the first object on the sheet; the third bit indicates that the raster object is the last object on a sheet; the fourth bit indicates whether the raster object is the last raster object for the print job; and the fifth bit indicates to print the entire current sheet blank, such as if one of the colors will not appear on the sheet or there are no line work or contone objects for the sheet. To print a blank sheet, a null contone (CT) and line work (LW) object indicating to print a blank sheet would have to be generated for each color plane. The copending and commonly assigned patent application entitled "Method, System, and Program for Error Checking Raster Objects," having U.S. Ser. No. 09/499,722, filed on Feb. 8, 2000, which application is incorporated herein by reference in its entirety, describes how the object type information is used to check the order in which the objects are received.

Compression type: information on the compression algorithm used to compress the raster object.

Priority level: indicates the priority for objects overlapping the same scan line. Objects with a higher priority are printed preferentially in place of other objects on a per pel basis. Thus, objects for a pel of a higher priority will appear over objects for a pel of a lower priority unless the high priority object is transparent to allow the lower priority object for the pel to appear through the higher priority object. Thus, the priority level indicates the order in which objects overlapping on a scan line are overlaid. The priority numbers are chosen to correspond to priorities of the four objects that overlap the same set of one or more scan lines.

Start and Stop Transport Addresses: Indicates the first and last coordinates the raster object occupies on the sheet in the transport direction.

Start and Stop Scan Addresses: Indicates the first and last coordinates the raster object occupies on the sheet in the scan direction.

Start and Stop Clip in Transport Direction: Indicates the start and stop in the transport direction of where to clip image. For instance, if the start transport address is less than the start clip address, then the image will be clipped, not printed, for those pixels prior to the start clip address. If the end transport address is greater than the end clip transport address, then the image will also be clipped.

Start and Stop Clip in Scan Direction: Indicates the start and stop in the scan direction of where to clip image.

Link Address: A pointer to the line work or contone data represented by the header. The link address for line work header would specify both the address of the line work data (eight bits per pel per color) and the line work control (LWC) bits.

After generating header objects for each contone and line work object, the raster image processor 8 generates one contone and one line work linked list of pointers to the headers according to the sequence number of the corresponding raster object. This list is then passed to the CIC card 14 to allow the CIC card 14 to gather information from the memory locations. The raster image processor 8 then hardens in memory the proxy objects as raster objects and the header objects thereof so that the raster object and header addresses will not be overwritten or altered in memory by the operating system before they are accessed and then released by the CIC card 14. In this way, all the raster object data is maintained in a high speed memory which provides fast access for the CIC card 14 when requesting the data to process. This memory arrangement further improves performance by allowing the CIC card 14 to immediately retrieve raster and header objects from a high speed, volatile memory.

The CIC Card Architecture

Figure 2:
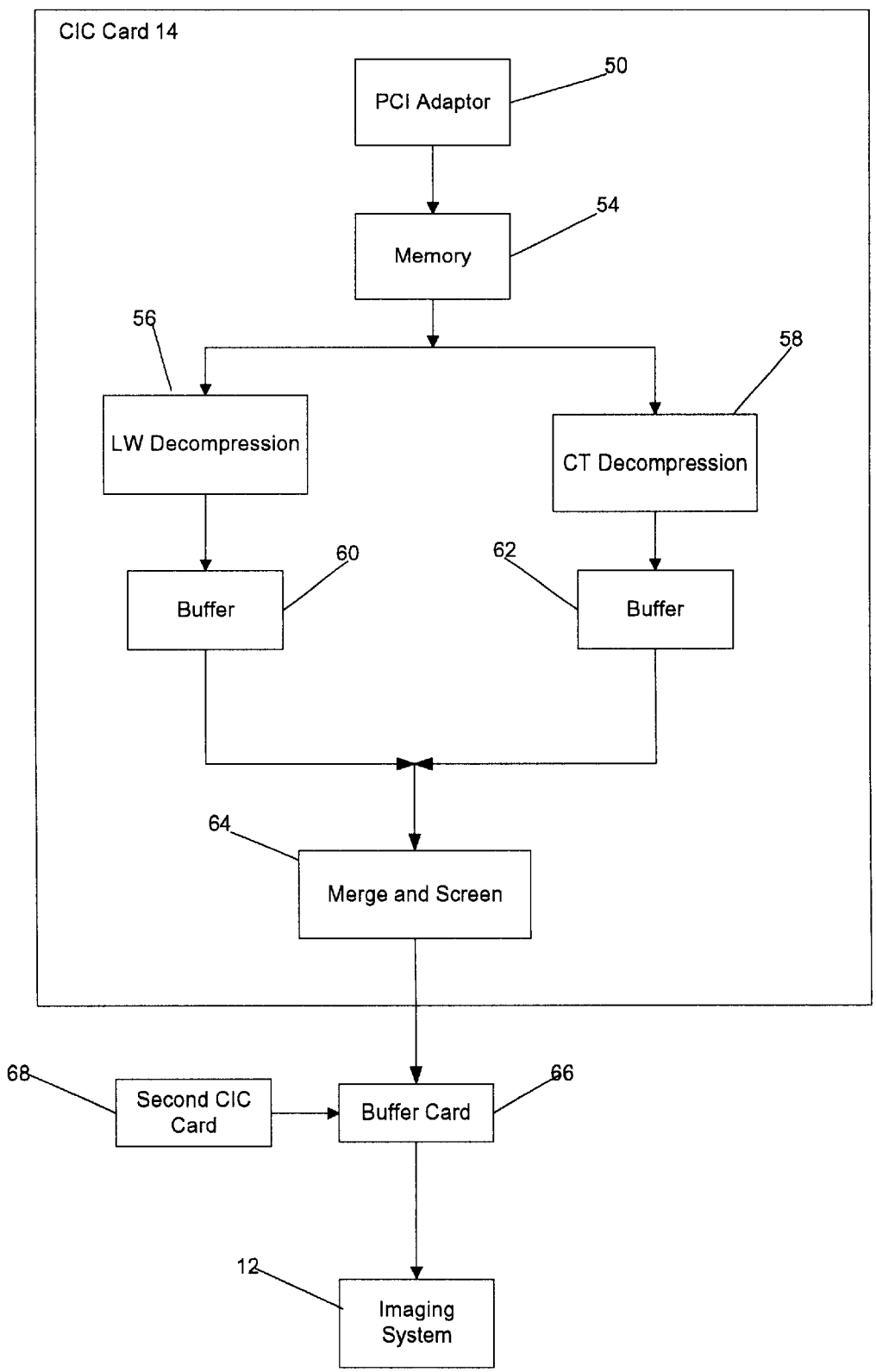
FIG. 2 illustrates hardware architecture implemented in a card that processes raster data in accordance with preferred embodiments of the present invention.

The CIC card 14 hardware retrieves the generated raster objects 10a, b, c, d, i.e., line work and contone objects, from the raster image processor 8 memory to generate final raster output for the imaging system 12. FIG. 2 illustrates a preferred embodiment architecture of the CIC card 14. A peripheral component interconnect (PCI) adaptor 50 includes logic to retrieve line work and contone objects from the raster image processor 8. Memory 54 buffers and stores the retrieved line work and contone objects and their headers. The memory 54 may comprise one or more memory cards for storing the header data, line work (LW) objects, contone (CT) objects, and line work control (LWC) objects. In preferred implementations, a separate memory card is used to store contone (CT) and line work (LW) data for each color plane (CMYK) and a separate card is used to store the header data. In embodiments where a CIC card 14 processes the line work (LW) and contone (CT) data for two color planes, there would be two memory cards, one for each color plane. The line work (LW) decompression 56 logic decompresses line work and line work control (LWC) objects and the contone (CT) 58 decompression logic decompress contone objects. The decompressor logic 56 and 58 writes the decompressed data into buffers 60 and 62, respectively.

The merge and screen logic 64 would access a byte of contone data from the contone (CT) buffer 62 and a byte of line work data from the line work buffer 60. Based on the value of the line work control (LWC) bits, i.e., line work select or contone select, the merge component of the logic 64 would merge the data into a single byte of data, from either the line work or contone data, and pass to the screening algorithm. Depending on the type of data, i.e., contone or line work, the screening logic would screen the data to provide the proper color intensity, and then write the data to the buffer card 66, which also receives pel data for two other color planes from a second CIC card 68. As discussed, in certain implementations, each CIC card 14 handles two color planes, thus requiring two cards for all four CMYK color planes.

Figure 3:
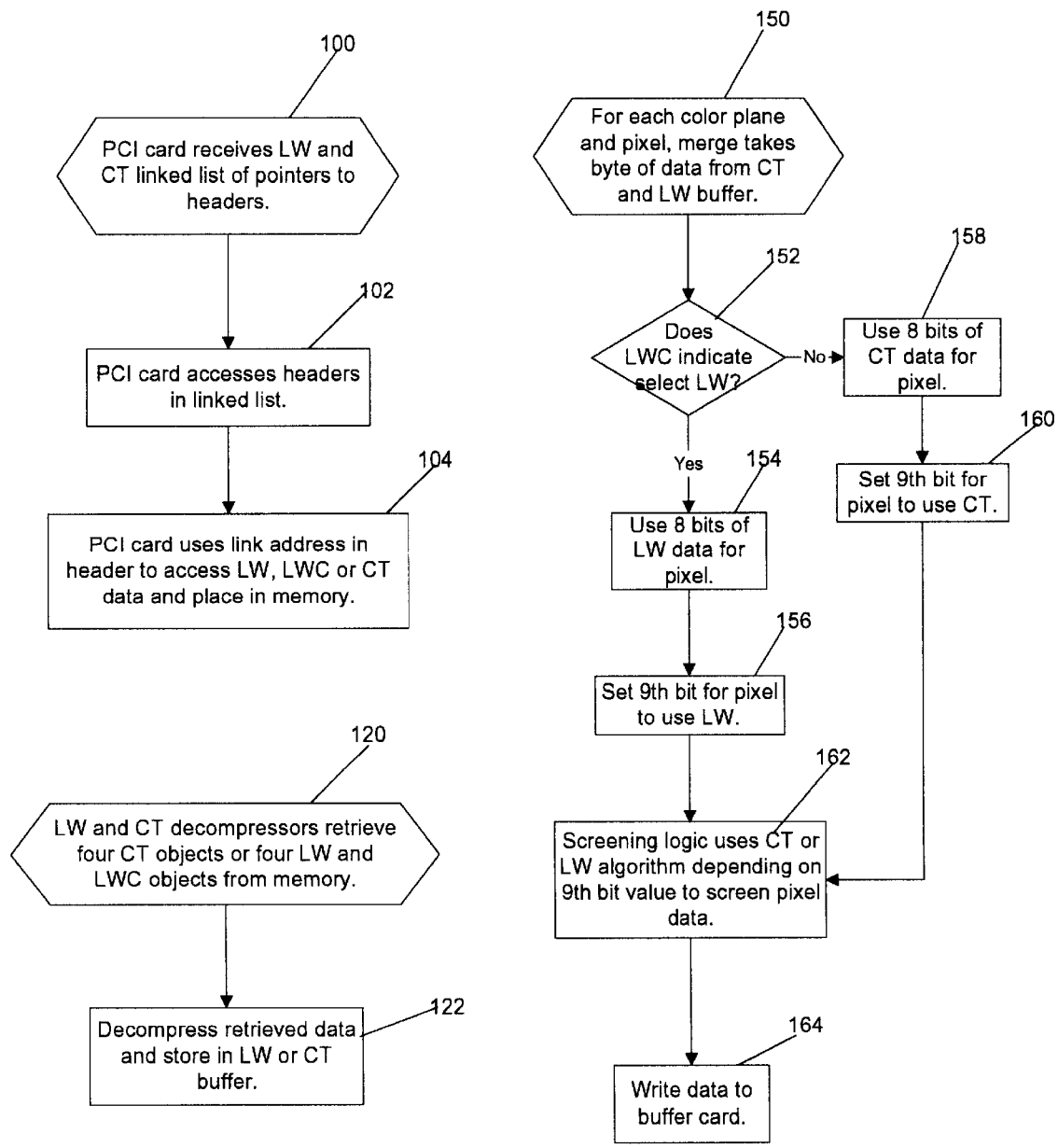
FIG. 3 illustrates logic implemented in the hardware card illustrated in FIG. 2 to process raster data.

FIG. 3 illustrates logic implemented in the above described hardware components of the CIC card 14 to process line work (LW), contone (CT) and line work control (LWC) objects from the raster image processor 8. At block 100, the PCI adaptor 50 receives one line work (LW) and one contone (CT) linked list of pointers to headers maintained in memory used by the raster image processor 8. The PCI adaptor 50 will then retrieve (at block 102) the line work (LW) and contone (CT) headers from the pointers in the linked list. As discussed a line work (LW) header includes a pointer to the line work control (LWC) bits for the pixel data.

The PCI adaptor 50 then goes through the linked list of headers and uses (at block 104) the link address in each header to access the pixel data. For contone headers, the PCI adaptor 50 would access the contone object, e.g., eight bits of color data, using the link address in the header. For line work (LW) headers, the PCI adaptor 50 would access the line work (LW) object and line work control (LWC) data from the pointers provided in the line address of the header. The PCI adaptor 50 then loads the line work (LW) and contone (CT) pixel data as well as the line work control (LWC) data into memory 54.

At block 120, the line work 56 and contone 58 decompressors retrieve up to four line work and four contone (CT) objects, respectively from the memory. The decompressors 56 and 58 then decompress (at block 122) the data and store the data in the line work (LW) 60 and contone (CT) 62 buffers, respectively. However, if the data is not compressed, then the data will not be subject to any decompression operations.

At block 150 the merge logic component of the merge and screen logic 64 accesses a byte of data for one pixel from the contone (CT) and line work (LW) buffers 60, 62 for each color plane. If (at block 152) the line work control (LWC) specifies select line work (LW), then the merge logic uses (at block 154) the eight bits of line work data for the current pixel and sets a ninth bit (at block 156) to indicate that the byte is line work. Otherwise, the merge logic uses (at block 158) eight bits of contone (CT) data for the pixel and sets (at block 160) the ninth bit to indicate contone for the pixel. The screening logic component of the merge and screen logic 64 then selects (at block 162) a line work or contone screening algorithm, depending on the value of the ninth bit. The eight bits of selected data for the pixel are then screened to produce the proper color intensity. After screening, the merge and screen logic 64 then writes the final pixel data for two of the color planes, e.g., CM, to the buffer card 66, which also receives screened pixel data for the other two color planes, e.g., YK. The imaging system 12 then accesses the data as needed from the buffer 66 to render as output, e.g., on a display screen, printer, etc.

In preferred embodiments, the raster image processor 8 converts input print data into one or more line work or contone raster objects which may then be provided to the CIC card 14 to further process to generate the final print output. In this way, a substantial amount of raster processing operations that the prior art would implement in the raster image processor are handled, in the preferred embodiments, by hardware logic (the CIC card 14).

Preferred embodiments substantially improve print performance because in the preferred embodiments, the raster image processor 8 only performs those raster operations needed to generate separate line work and contone objects that are further processed, i.e., decompressed, merged and screened, by hardware logic, thus offloading many of the highly processor intensive operations to dedicated hardware logic which can often perform such operations faster than the programmable logic of the raster image processor 8.

Further by having two or more processors perform raster operations performed in the prior art by a single raster image processor, performance is substantially improved. Thus, preferred embodiments provide an improved way for allocating particular raster operations to the raster image processor 8 and to another processing unit, such as the CIC card 14, in order to improve the speed and performance of raster image processing.

Still further, by using multiple memory buffers during the raster processing operation, the CIC 14 card optimizes performance because data is always available for the logic. For instance, the PCI adaptor 50 retrieves data in the memory 54 at a rate such that there is always data pending while the decompressors 54 and 56 are decompressing data. Thus, the memory 54 makes data available to the decompressors 54 and 56 when the decompressor completes a decompression operation. Further, the buffers 60 and 62 are used to buffer decompressed data to always make available for the merge and screen logic 64 to use. This architecture has been found to be particularly useful because the decompressors 54 and 56 tend to decompress in burst mode, while the merge and screen logic 64 processes data at a relatively constant rate as needed by the imaging system 12. Thus, the buffers 60 and 62 ensure that data is always available for the merge and screen logic 64. The end result is that delays are minimized for the major processing operations within the dedicated logic of the CIC card 14, such as the decompression and merge and screen operations, as data is always available to this logic for processing.

High Performance Line Work Decompression Architecture

Figure 4:
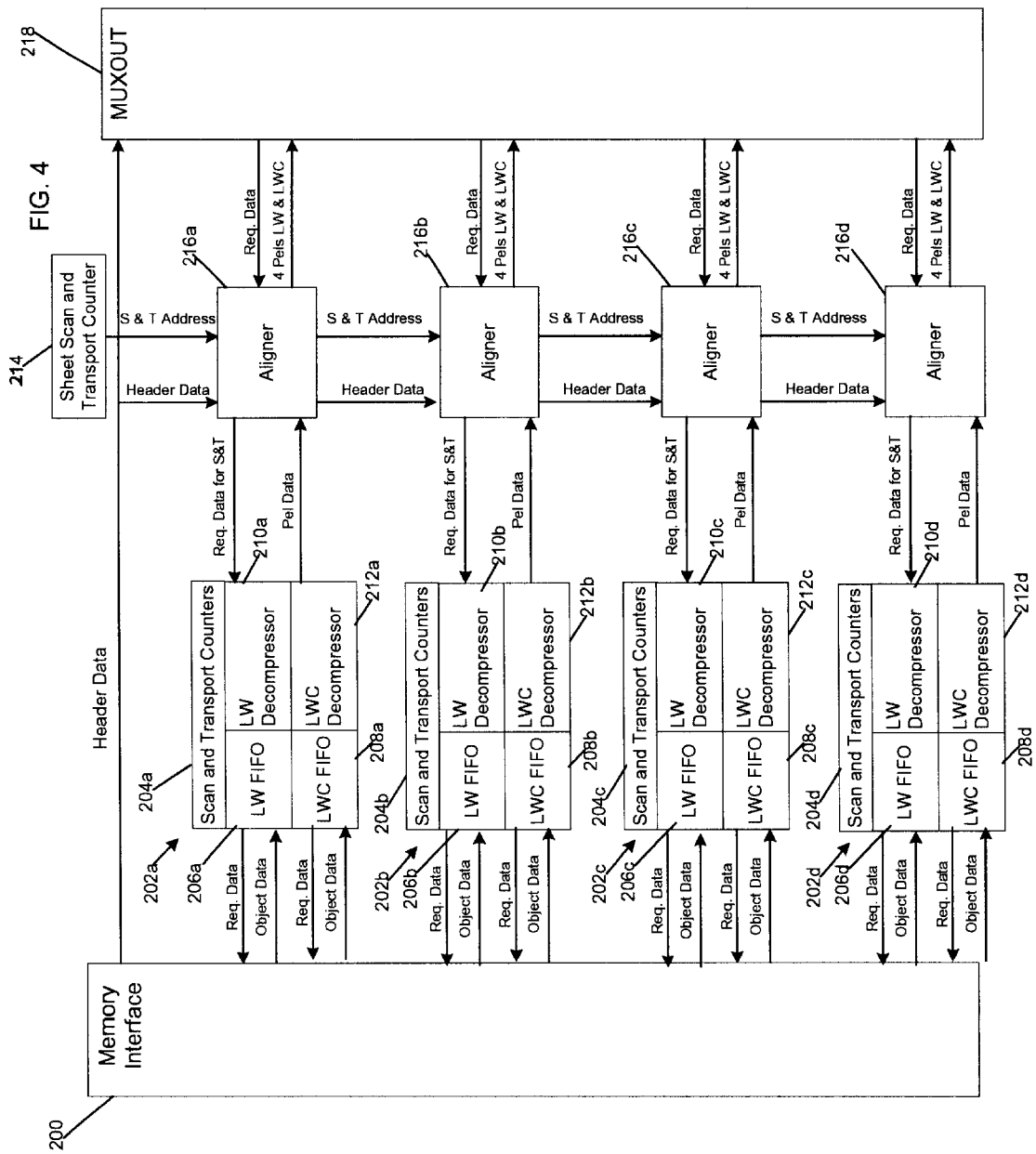
FIG. 4 illustrates a layout of hardware logic in accordance with preferred embodiments of the present invention.

FIG. 4 illustrates the hardware architecture of the line work decompressors and other components, such as the align logic and overlay logic, that are used to process line work objects overlapping a pixel to select the appropriate data before the data is stored in buffer 60 and available for the merge and screen operation. A memory interface 200 provides an interface to memory 54 (FIG. 2) to continually make available and buffer line work (LW), line work control (LWC), and header data. Decompressor units 202a, b, c, d each include scan and transport counters 204a, b, c, d; line work (LW) First-in-first-out buffer (FIFO) 206a, b, c, d to buffer line work data; line work control (LWC) First-in-first-out buffer (FIFO) 208a, b, c, d to buffer line work data; line work decompressor logic 210a, b, c, d; and line work control (LWC) decompressor logic 212a, b, c, d. The sheet scan and transport counter 214 provides the current scan and transport address location in the sheet that is being processed by the aligner logic 216a, b, c, d.

After decompressing pixel data for a line work object, if the data is compressed, the line work (LW) 210a, b, c, d and line work control (LWC) 212a, b, c, d decompressors would transfer the pixel data in the decompressed object to the aligner logic 216a, b, c, d, which then performs any necessary clipping based on the scan and transport clip data in the header for the pixel data received. The aligner logic 216a, b, c, d outputs pixel data for four pels, or one byte per pixel, including the two line work control (LWC) bits to the multiplexer (MUXOUT) 218 logic. The aligner logic 216a, b, c, d further sets a use/passbit for each pixel, which is control data in addition to the line work control (LWC) bits, that indicates whether to ignore the data, i.e., that it has been clipped. The use/pass bit instructs the MUXOUT 218 whether to use/pass data for the pixel from the object to the merge and screen 64 or whether the data is not to be used. The MUXOUT 218 determines how overlapping data for a same pixel are selected. In preferred embodiments, the aligners 216a, b, c, d and MUXOUT 218 have buffers to buffer data to ensure that data is always available for their respective operations.

The above architecture thus includes multiple instances of the same logic, i.e., FIFO, decompressor, aligner, etc., to simultaneously process pixel data for up to four line work raster objects that may provide data for the same scan line. With this logic, all the object data for a pixel can be processed in parallel in the same clock cycle using the redundant decompressor units 202a, b, c, d and aligners 216a, b, c, d.

Figure 5:
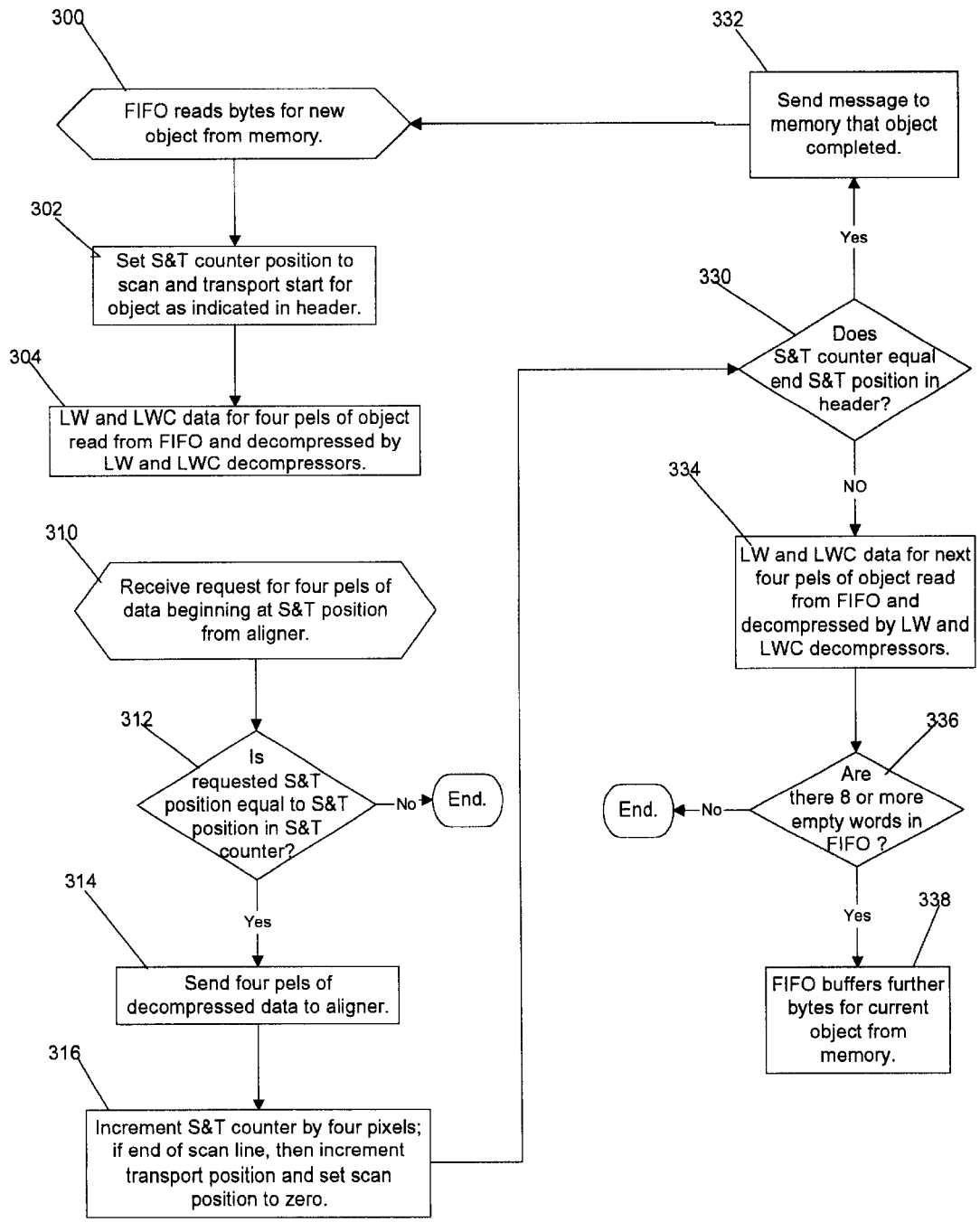
FIGS. 5, 6, 7, 8a, and 8b illustrate operations performed by the logic in FIG. 4 to decompress, align, and select pixel data from one of multiple objects for a pixel location in accordance with preferred embodiments of the present invention.

FIG. 5 illustrates hardware logic implemented in the decompressor units 202a, b, c, d to retrieve and output data to the aligner logic 216a, b, c, d. The logic of FIG. 5 is described with respect to the operations in one of the decompressor units 202a, b, c, d. Each decompressor unit 202a, b, c, d may perform operations on multiple line work (LW) objects in parallel during the same clock cycle to improve performance. Control begins at block 300 with one of the LW and LWC FIFOs 106a, b, c, d reading bytes for a new object from memory 54 (FIG. 2) through the memory interface 200. The scan and transport (S&T) counters 204a, b, c, d are set (at block 202) to the start scan and transport for the new object for the decompressor 202a, b, c, d to process. The start and end scan and transport data for the new object is read from the header data for the object. The line work (LW) 210a, b, c, d and line work control (LWC) 212a, b, c, d decompressors then read and decompress (at block 304) four pels of data, i.e., a byte of color data for each pel and two line work control (LWC) bits for each pel, from the line work (LW) 206a and line work control (LWC) 208a FIFOs, respectively. If the data is not compressed, then the decompressors would not perform a decompression operation.

At block 310, the line work (LW) 210a, b, c, d and line work control (LWC) 212a, b, c, d decompressors receive a request (at block 310) from the corresponding aligner logic 216a, b, c, d for four pels of data beginning at a scan and transport (S&T) position in the sheet. If (at block 312) the requested scan and transport (S&T) position is equal to the scan and transport (S&T) position maintained in the scan and transport counters 204a, b, c, d in the decompressor unit 202a, b, c, d, then the line work (LW) 210a, b, c, d and line work control (LWC) 212a, b, c, d decompressors send four pels of line work and line work control data to the corresponding aligner 216a, b, c, d. The scan and transport (S&T) counters 204a, b, c, d are then incremented (at block 316) by four pixels. If the end of a scan line is reached, then the transport counter is incremented and the scan line counter is reset to zero to move the counters to the first pixel position in the next scan line.

If (at block 330) the incremented scan and transport (S&T) counters 204a, b, c, d equal the end scan and transport position indicated in the header for the object, then the entire contents of the object has been decompressed and forwarded to the aligner 216a, b, c, d. In such case, the counter logic 204a, b, c, d sends (at block 332) a message that the object has completed, which causes the FIFOs 206a, b, c, d and 208a, b, c, d to request the next object from the memory interface 200. If (at block 330), the end of the object has not been reached, then the decompressors 210a, b, c, d and 212a, b, c, d read and decompress data for the next four pels from the FIFOs 206a, b, c, d and 208a, b, c, d, respectively. If (at block 336) there are at least eight empty words in the FIFO 206a, b, c, d and 208a, b, c, d, where there are four bytes per word, then the FIFO reads (at block 338) in further object data from the memory 54 (FIG. 2) through the memory interface 200.

Figure 6:
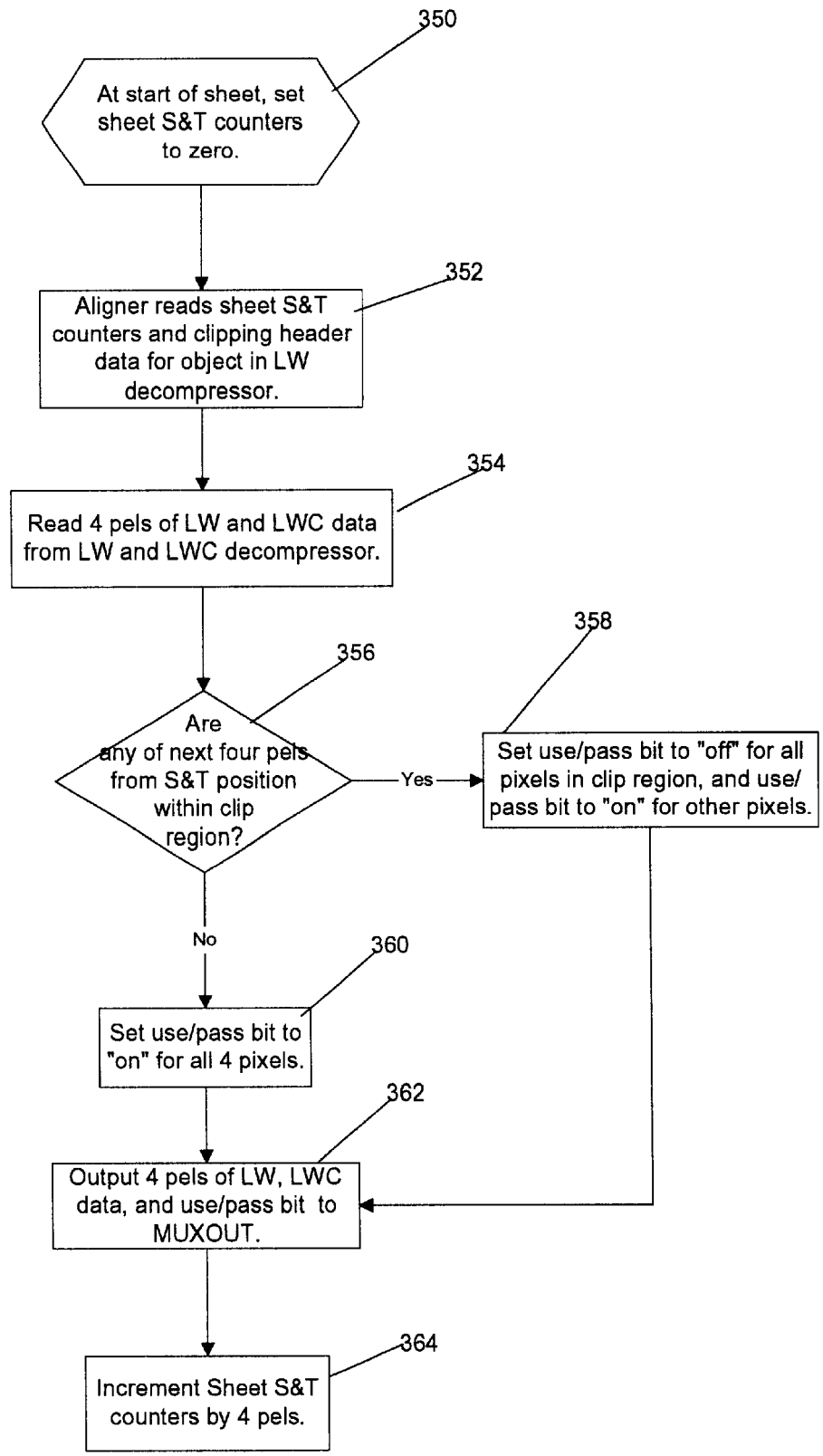

FIG. 6 illustrates the aligner logic 216a, b, c, d that is executed to provide the MUXOUT 218 four pels of data from each object that is providing pixel data for the current scan and transport position in the sheet. At the start of a sheet (at block 350), the sheet scan and transport (S&T) counters 214 are initialized to zero. The aligner logic 216a, b, c, d then reads (at block 352) the sheet scan and transport (S&T) counters 214 and the start and stop of the clip region for the scan and transport directions in the header for the object. If(at block 356) the scan and transport (S&T) position of the four pels that were read fall within a clip region, then the aligner 216a, b, c, d sets (at block 358) the use/pass bit to off, to instruct the MUXOUT 218 to ignore the data. Otherwise, if the pixel does not fall within the clip region, then the use/pass bit is set (at block 360) to "on", instructing the MUXOUT 218 to consider the pixel data and line work control (LWC) bits. The aligner 216a, b, c, d then outputs (at block 362) four pels of line work (LW), the line work control (LWC) bits, and the use/pass bit to the MUXOUT 218 data and increments (at block 364) the sheet scan and transport (S&T) counters 214 by four pels.

Figure 7:
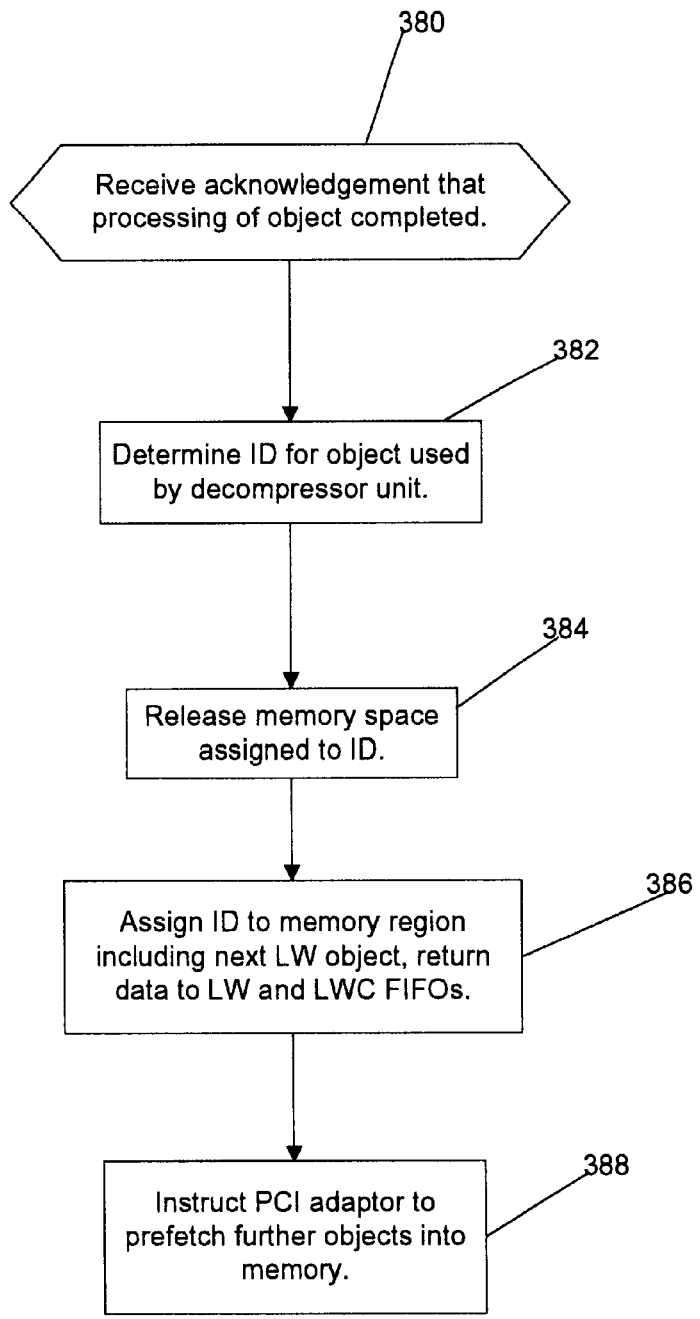

FIG. 7 illustrates logic implemented in the memory interface 200 hardware to interface between the FIFO buffers 206a, b, c, d and 208a, b, c, d and the memory 54. Control begins at block 380 with the memory interface 200 logic receiving acknowledgment that one decompressor unit 202a,b, c, d has completed processing an object and transferred all the bytes from the object to the corresponding aligner 216a, b, c, d. In such case, the memory interface 200 determines (at block 382) the ID for the object used by the decompressor unit and instructs (at block 384) the memory 54 (FIG. 2) to release the memory space used to store that object assigned to the ID. In preferred embodiments, each decompressor unit 202a, b, c, d is assigned an ID that it uses to access object data from the memory interface 200. The memory interface 200 then assigns (at block 386) the ID for that decompressor unit 202a, b, c, d to another memory space storing the next object on the sheet that needs to be processed. The memory interface 200 further instructs the PCI adaptor 50 to prefetch further objects in memory.

In preferred embodiments, the memory interface 200 ensures that there is always at least two objects for each decompressor unit 202a, b, c, d maintained in memory 54 at any given time. In this way, a pipeline of data is always full as there is always object data to feed to the decompressor units 202a, b, c, d when they complete processing an object. The memory interface 200 further includes logic to return line work object data to the FIFOs 206a, b, c, d and 208a, b, c, d when they request further pixel data for the object being processed (at blocks 336 and 338) to buffer.

With the above hardware logic, the decompressor units 202a, b, c, d and aligners 216a, b, c, d can decompress and align in parallel pixel data from multiple objects for the same pixel and provide such pixel data for the same pixels on the sheet to the MUXOUT 218, which then selects one of the multiple objects from which the line work and control data will be sent to the buffer 60. The buffer 60 is accessible to the merge and screen logic 64. Further, with the preferred embodiment hardware architecture, data is always available for processing at any of the logic components. For instance, the memory interface 200 always ensures that there is line work object data in memory 54 for each of the decompression units 202a, b, c, d when they complete processing a line work object. The FIFOs 206a, b, c, d and 208a, b, c, d always ensure that pel data is available for the decompression components 210a, b, c, d and 212a, b, c, d, respectively, when they output decompressed data to the corresponding aligner 216a, b, c, d. Further, the aligners 216a, b, c, d always have pel data for the next four pels in the sheet available for the MUXOUT 218.

Overlaid Selection Priority Scheme

The MUXOUT 218 comprises a multiplexer that implements a truth table that is capable of receiving up to four sets of line work and control data for the same pel, i.e., pixel data from one to four line work objects being processed and then capable of selecting pixel data from one of the four sets of the line work data to use. The MUXOUT 218 then outputs the selected line work pixel data and determined line work control (LWC) to the buffer 60. The merge and screen logic 64 accesses the line work color data and line work control (LWC) for a pixel from the buffer 60 and contone data for the pixel from buffer 62 and then uses the line work control (LWC) to select one of contone or line work color data for the pixel to process according to the screening algorithm.

Figure 8A:
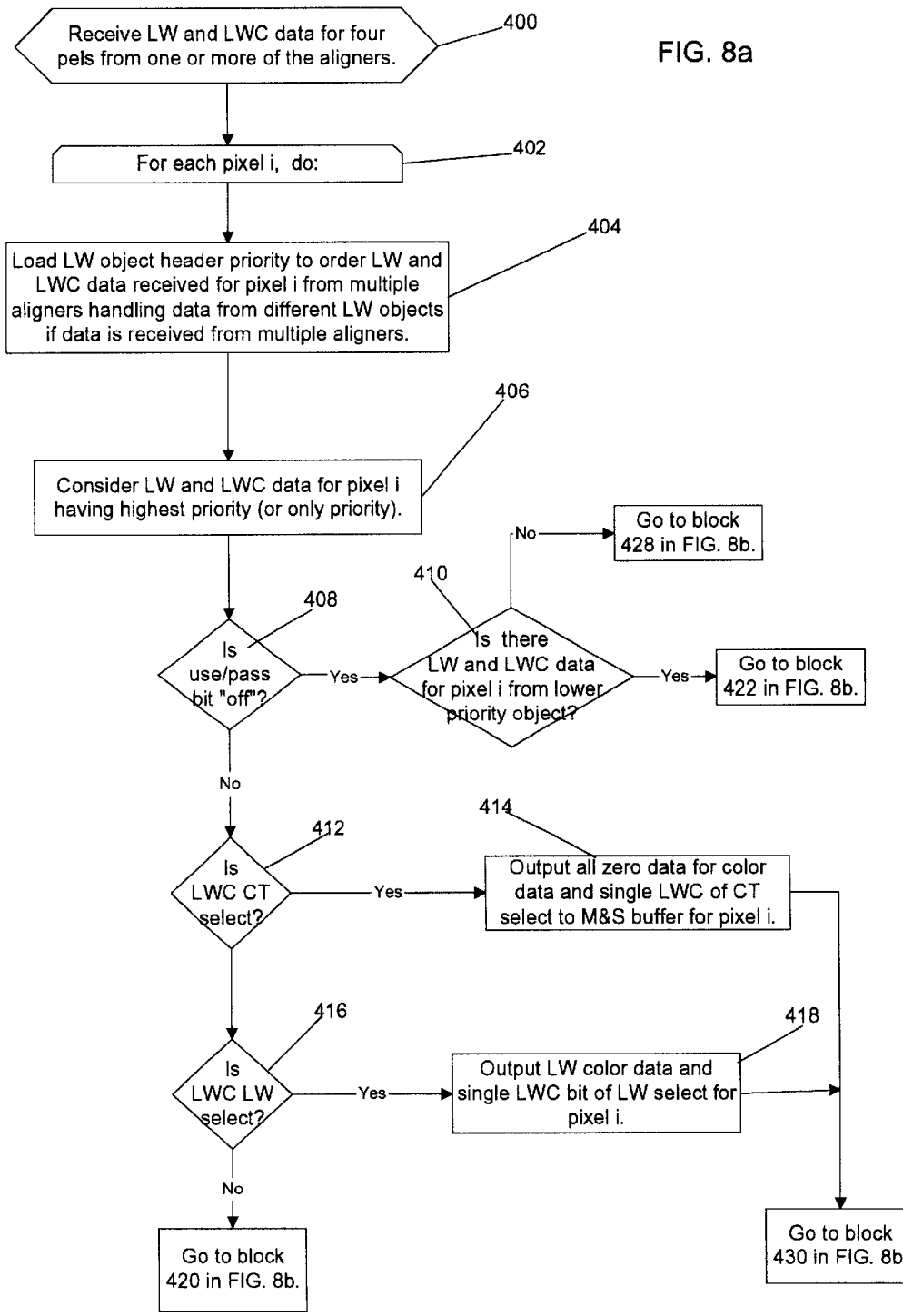

FIGS. 8*a*, *b* illustrates the logic of the truth table implemented in the MUXOUT 218 to process the line work color data (one byte) and line work control (LWC) data (two bits) received for four pixels from one or more of the aligners 216*a*, *b*, *c*, *d*. The logic of FIG. 8*a*, *b* would be implemented as a truth table in the MUXOUT 218. The logic begins at block 400 with the MUXOUT 218 receiving line work (LW) and line work control (LWC) data for four pels from one or more of the aligners 216*a*, *b*, *c*, *d*. For each pixel i, where i can be any integer between one and four, the MUXOUT 218 implements the logic described at blocks 404 to 418 to select data for the pixel from the data received from the aligners 216*a*, *b*, *c*, *d*. At block 404, the MUXOUT 218 logic loads into registers the line work (LW) and line work control (LWC) data from one or more of the aligners 216*a*, *b*, *c*, *d* and also loads into a register the priority value for the data, which is maintained in the header for the line work object from which the line work (LW) and line work control (LWC) data originated. As discussed, data for the pixel i may only be received from one aligner 216*a*, *b*, *c*, *d*.

Figure 8B:
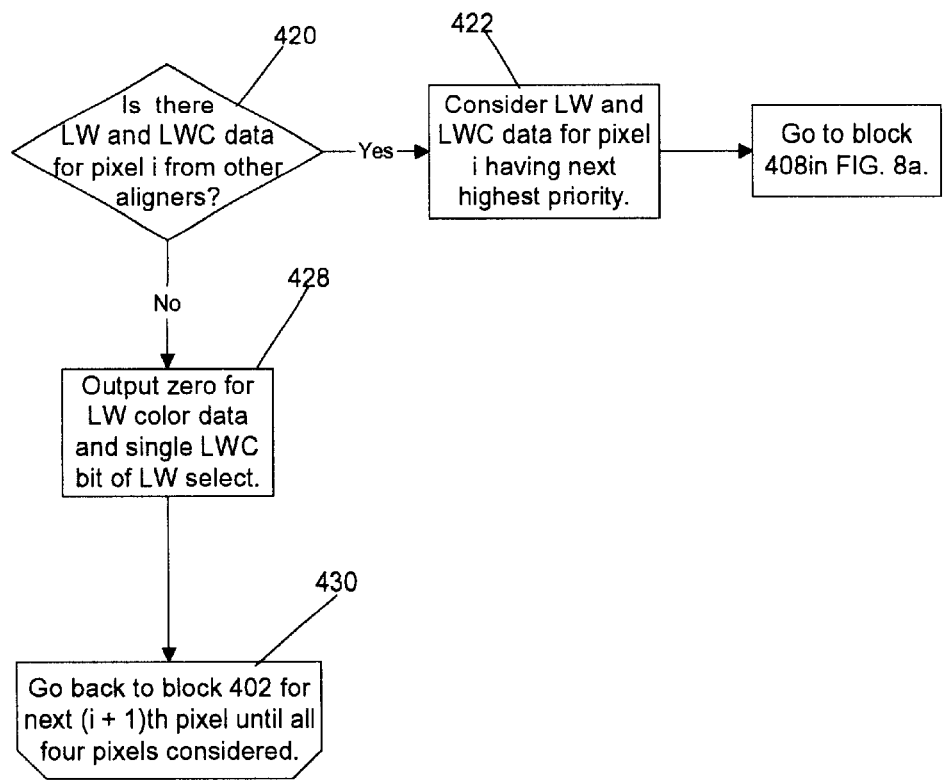

The MUXOUT 218 then considers (at block 406) the line work (LW) and line work control (LWC) data for pixel i from the object having the highest priority, as indicated in the header. If (at block 408) the use/pass bit is "on", indicating that the pixel was not in a clip region, and (at block 412) the line work control (LWC) bits indicate contone (CT) select, then the MUXOUT 218 outputs (at block 414) all zero data for the line work (LW) color data and a single line work control (LWC) bit indicating contone (CT) select, and proceeds to block 430 in FIG. 8*b* to consider the next pixel. Otherwise, if (at block 416) the line work control (LWC) is line work (LW) select, then the MUXOUT 218 outputs the line work color data from the object being considered and a single line work control (LWC) bit indicating line work (LW) select for pixel i, and proceeds to block 430 in FIG. 8*b* to consider the next pixel.

If the pass bit is "on", line work control (LWC) is not contone (CT) nor line work (LW) select, then the line work control (LWC) must be transparent. If line work control (LWC) is transparent and there is further line work (LW) and line work control (LWC) data for pixel i from the other alingers 216*a*, *b*, *c*, *d* not yet considered (at block 420), then the MUXOUT 218 would consider (at block 422) the next highest priority line work object for pixel i and proceed back to block 408 in FIG. 8*a*. Otherwise, if there are no further objects for pixel i to consider, then the MUXOUT 218 outputs (at block 428) zero data for the line work (LW) color data and a single line work control (LWC) bit of line work (LW) select.

If (at block 408) the use/pass bit is "off" and there are no further lower priority line work (LW) objects providing data for pixel i, then the MUXOUT 218 proceeds to block 428 to output all zero data and contone (CT) select. If there are further line work (LW) objects for pixel i, then control proceeds to block 422 to consider the data in the next line work object. From blocks 414, 418, 426 or 428, control transfers to block 430 in FIG. 8*b* to consider the next pixel i for which line work objects are provided.

The above hardware architecture allows for parallel processing at two levels, parallel processing of multiple objects that provide line work data for a same pixel position and parallel processing of different of the raster operations for different pixels. For instance, there are four instances of each hardware component, the decompressor unit 202*a*, *b*, *c*, *d*, and aligner 216*a*, *b*, *c*, *d* that allows data for the same pixel from up to four different objects to be processed in parallel. Further, the different operations of decompression, alignment, and the overlaying and selection of data performed by the MUXOUT 218 occurs in parallel. Thus, as data for one set of pixels is being overlaid by the MUXOUT 218, data for the next set of pixels is being aligned by the aligners 216*a*, *b*, *c*, *d* and data for a still further set of pixels is being decompressed. Still further, these three operations are performed at the same time the merge and screen logic 64 (FIG. 2) is merging and screening the data to produce the final raster data to send to the imaging system 12.

This hardware arrangement provides for very fast processing of multiple objects that contain line work data for the same pixel over current techniques for generating final output raster data for the device. Further, because line work data is always made available in buffers prior to each operation, the hardware logic for each operation is always processing data to produce the final raster data that is stored in the buffer card 66 to make available for the imaging system 12 as needed.

Alternative Embodiments and Conclusions

The following describes some alternative embodiments for accomplishing the present invention.

The preferred embodiments may be implemented as a method, apparatus or logic using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred embodiments, the raster objects had specific information, such as the object type, sequence number, etc., used to determine whether objects were received in the correct order. In alternative embodiments, further or modified information may be included in the raster objects to ensure that raster objects are processed in the correct order. Further there may be different or additional object types other than those discussed herein.

In preferred embodiments, the CIC card that processes the generated raster objects comprises hardware logic. In alternative embodiments, an additional processor may be used to perform the further processing of the raster objects generated in accordance with the preferred embodiments. Alternatively, a single processor may spawn multiple tasks to perform the operations performed by the different instances of the hardware logic. Still further, the logic of the CIC card may be divided across multiple computer cards or related devices.

In preferred embodiments, the raster objects are generated for a printer to use to control printer operations. However, in alternative embodiments the raster objects may provide color data for another device, such as a computer graphics card or display engine, to use when generating output display data.

Further, the CIC card 14 may be implemented in hardware other than a PCI card on the printer controller backplane. Still further, operations described as performed in the raster image processor may be moved to the CIC card or alternative raster logic.

In preferred embodiments, there were four sets of each of the hardware components to process up to four objects for a same scan line simultaneously. In alternative embodiments, there may be more or less instances of the hardware logic to processor more or less line work objects for a same line.

In preferred embodiments, each line work control object provided line work and line work control data for four pixels. In alternative embodiments, each line work control object may provide data for more or less than four pixels. In summary, preferred embodiments disclose a method, system, and logic for receiving line work data and control data for pixels on a sheet from objects. The control data for one pixel indicates whether to use the line work color data for the pixel or contone raster object for the pixel. Further, multiple objects may provide line work data and control data for a same pixel. Line work and control data are simultaneously decompressed for a same set of pixels from the multiple objects and decompressed line work and control data are simultaneously aligned for a same set of pixels from the multiple objects.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving line work data and control data for pixels on a sheet from objects, wherein control data for one pixel indicates whether to use the line work data for the pixel or contone data for the pixel, and wherein multiple objects may provide line work data and control data for a same pixel;
   simultaneously decompressing line work and control data for a same set of pixels from the multiple objects;
   simultaneously aligning decompressed line work and control data for the same set of pixels from the multiple objects; and
   buffering in a buffer the simultaneously aligned line work and control data for the pixel from the multiple objects.

2. The method of claim 1, wherein the decompression and aligning operations occur simultaneously and wherein the set of pixels for which line work and control data is decompressed is different from the set of pixels for which line work and control data are simultaneously aligned.

3. The method of claim 1, further comprising using the control data for the pixel in the buffer to select one of the simultaneously aligned line work and control data for the pixel buffered in the buffer.

4. The method of claim 1, wherein the buffer comprises a first buffer further comprising:
   simultaneously buffering line work and control data for multiple pixels from one object in a second buffer comprising a decompression buffer; and
   accessing the line work and control data from the decompression buffer to decompress after sending the decompressed line work and control data to aligning logic.

5. The method of claim 4, further comprising:
   loading from a memory into the decompression buffer line work and control data from the object providing previously decompressed line work and control data if the decompression buffer reaches a threshold.

6. The method of claim 4, further comprising:
   loading from the memory into the decompression buffer line work and control data from a new object after all the line work and control data from the object is decompressed and sent to the aligning logic.

7. The method of claim 6, further comprising:
   loading an additional object into the memory after buffering the new object in the decompression buffer.

8. The method of claim 1, further comprising:
   receiving a request for data at a pixel position to align, wherein the line work and control data are not aligned if the pixel position for the line work and control data is not the same as the requested pixel position.

9. The method of claim 8, wherein the buffer comprises a first buffer; and wherein line work and control data for four pixels are buffered in a second buffer comprising an aligning logic buffer to be aligned if the pixel position of the line work and control data for the first pixel of the four pixels is the same as the requested pixel position.

10. The method of claim 9, wherein the control data is further capable of indicating to ignore or use the line work and control data for the object, further comprising:
    loading data indicating a clipping region;
    before aligning the line work and control data for the pixel, setting the control data for one pixel in the aligning logic buffer to indicate to ignore the line work and control data from the object if the location of the pixel is within the clipping region; and
    setting the control data for one pixel in the aligning logic buffer to indicate to use the line work and control data from the object if the location of the pixel is not within the clipping region.

11. The method of claim 1, wherein simultaneously aligning decompressed line work and control data is performed subsequent to completion of simultaneously decompressing line work and control data, and wherein buffering is performed subsequent to completion of simultaneously aligning the decompressed line work.

12. The method of claim 11, wherein a decision on whether to ignore or use the line work and control data is based on a clipping region.

13. The method of claim 11, wherein before aligning the line work and control data for the pixel, setting the control data for one pixel to indicate to ignore the line work if the location of the pixel is within a clipping region.

14. The method of claim 11, further comprising:
    setting the control data for one pixel to indicate to use the line work and control data if the location of the pixel is not within the clipping region.

15. A system for processing pixel data, comprising:

means for receiving line work data and control data for pixels on a sheet from objects, wherein control data for one pixel indicates whether to use the line work data for the pixel or contone data for the pixel, and wherein multiple objects may provide line work data and control data for a same pixel;

means for simultaneously decompressing line work and control data for a same set of pixels from the multiple objects;

means for simultaneously aligning decompressed line work and control data for the same set of pixels from the multiple objects; and means for buffering in a buffer the simultaneously aligned line work and control data for the pixel from the multiple objects.

16. The system of claim 15, wherein the decompression and aligning operations occur simultaneously and wherein the set of pixels for which line work and control data is decompressed is different from the set of pixels for which line work and control data are simultaneously aligned.

17. The system of claim 15, further comprising means for using the control data for the pixel in the buffer to select one of the simultaneously aligned line work and control data for the pixel buffered in the buffer.

18. The system of claim 15, further comprising:

means for simultaneously buffering line work and control data for multiple pixels from one object in a second buffer comprising a decompression buffer; and means for accessing the line work and control data from the decompression buffer to decompress after sending the decompressed line work and control data to aligning logic.

19. The system of claim 18, further comprising:

means for loading from a memory into the decompression buffer line work and control data from the object providing previously decompressed line work and control data if the decompression buffer reaches a threshold.

20. The system of claim 18, further comprising:

means for loading from the memory into the decompression buffer line work and control data from a new object after all the line work and control data from the object is decompressed and sent to the aligning logic.

21. The system of claim 20, further comprising:

means for loading an additional object into the memory after buffering the new object in the decompression buffer.

22. The system of claim 15, further comprising:

means for receiving a request for data at a pixel position to align, wherein the line work and control data are not aligned if the pixel position for the line work and control data is not the same as the requested pixel position.

23. The system of claim 22, wherein line work and control data for four pixels are buffered in a second buffer comprising an aligning logic buffer to be aligned if the pixel position of the line work and control data for the first pixel of the four pixels is the same as the requested pixel position.

24. The system of claim 23, wherein the control data is further capable of indicating to ignore or use the line work and control data for the object, further comprising:

means for loading data indicating a clipping region;

means for setting the control data for one pixel in the aligning logic buffer to indicate to ignore the line work and control data from the object if the location of the pixel is within the clipping region; and means for setting the control data for one pixel in the aligning logic buffer to indicate to use the line work and control data from the object if the location of the pixel is not within the clipping region.

25. The system of claim 15, wherein simultaneously aligning decompressed line work and control data is performed subsequent to completion of simultaneously decompressing line work and control data, and wherein buffering is performed subsequent to completion of simultaneously aligning the decompressed line work.

26. The system of claim 25, wherein a decision on whether to ignore or use the line work and control data is based on a clipping region.

27. The system of claim 25 further comprising:

means for setting the control data for one pixel to indicate to ignore the line work if the location of the pixel is within a clipping region.

28. The system of claim 25 further comprising:

means for setting the control data for one pixel to indicate to use the line work and control data if the location of the pixel is not within the clipping region.

29. Logic for processing pixel data that is capable of performing:

receiving line work data and control data for pixels on a sheet from objects, wherein control data for one pixel indicates whether to use the line work data for the pixel or contone data for the pixel, and wherein multiple objects may provide line work data and control data for a same pixel;

simultaneously decompressing line work and control data for a same set of pixels from the multiple objects;

simultaneously aligning decompressed line work and control data for the same set of pixels from the multiple objects; and buffering in a buffer the simultaneously aligned line work and control data for the pixel from the multiple objects.

30. The logic of claim 29, wherein the decompression and aligning operations occur simultaneously and wherein the set of pixels for which line work and control data is decompressed is different from the set of pixels for which line work and control data are simultaneously aligned.

31. The logic of claim 29, further capable of performing using the control data for the pixel in the buffer to select one of the simultaneously aligned line work and control data for the pixel buffered in the buffer.

32. The logic of claim 29, further capable of performing:

simultaneously buffering line work and control data for multiple pixels from one object in a second buffer comprising a decompression buffer; and accessing the line work and control data from the decompression buffer to decompress after sending the decompressed line work and control data to aligning logic.

33. The logic of claim 29, further capable of performing:

loading from a memory into the decompression buffer line work and control data from the object providing previously decompressed line work and control data if the decompression buffer reaches a threshold.

34. The logic of claim 32, further capable of performing:

loading from the memory into the decompression buffer line work and control data from a new object after all the line work and control data from the object is decompressed and sent to the aligning logic.

35. The logic of claim 34, further capable of performing:
loading an additional object into the memory after buffering the new object in the decompression buffer.

36. The logic of claim 29, further capable of performing:
receiving a request for data at a pixel position to align, wherein the line work and control data are not aligned if the pixel position for the line work and control data is not the same as the requested pixel position.

37. The logic of claim 36, wherein the buffer comprises a first buffer, and wherein line work and control data for four pixels are buffered in a second buffer comprising an aligning logic buffer to be aligned if the pixel position of the line work and control data for the first pixel of the four pixels is the same as the requested pixel position.

38. The logic of claim 37, wherein the control data is further capable of indicating to ignore or use the line work and control data for the object, further capable of performing:
loading data indicating a clipping region;
before aligning the line work and control data for the pixel, setting the control data for one pixel in the aligning logic buffer to indicate to ignore the line work and control data from the object if the location of the pixel is within the clipping region; and
setting the control data for one pixel in the aligning logic buffer to indicate to use the line work and control data from the object if the location of the pixel is not within the clipping region.

39. The logic of claim 29, wherein the logic comprises programmable logic implemented in a hardware device.

40. The logic of claim 39, wherein the hardware device including the programmable logic comprises a computer card.

41. The logic of claim 29, wherein the logic comprises at least one computer program executable by a processor.

42. The logic of claim 29, wherein simultaneously aligning decompressed line work and control data is performed subsequent to completion of simultaneously decompressing line work and control data, and wherein buffering is performed subsequent to completion of simultaneously aligning the decompressed line work.

43. The logic of claim 42, wherein a decision on whether to ignore or use the line work and control data is based on a clipping region.

44. The logic of claim 42, wherein before aligning the line work and control data for the pixel, setting the control data for one pixel to indicate to ignore the line work if the location of the pixel is within a clipping region.

45. The logic of claim 42, further comprising:
setting the control data for one pixel to indicate to use the line work and control data if the location of the pixel is not within the clipping region.

46. Apparatus, comprising:
a first logic element which receives line work data and control data for pixels on a sheet from objects, wherein control data for one pixel indicates whether to use the line work data for the pixel or contone data for the pixel, and wherein multiple objects may provide line work data and control data for a same pixel;
a second logic element which simultaneously decompresses line work and control data for a same set of pixels from the multiple objects;
a third logic element which simultaneously aligns decompressed line work and control data for the same set of pixels from the multiple objects; and
a fourth logic element which buffers in a buffer the simultaneously aligned line work and control data for the pixel from the multiple objects.

47. The apparatus of claim 46, wherein the decompression and aligning operations occur simultaneously and wherein the set of pixels for which line work and control data is decompressed is different from the set of pixels for which line work and control data are simultaneously aligned.

48. The apparatus of claim 46, further comprising a fifth logic element which uses the control data for the pixel in the buffer to select one of the simultaneously aligned line work and control data for the pixel buffered in the buffer.

49. The apparatus of claim 46, further comprising:
a sixth logic element which simultaneously buffers line work and control data for multiple pixels from one object in a second buffer comprising a decompression buffer; and
a seventh logic element which accesses the line work and control data from the decompression buffer to decompress after sending the decompressed line work and control data to aligning logic.

50. The apparatus of claim 49, further comprising:
an eighth logic element which loads from a memory into the decompression buffer line work and control data from the object providing previously decompressed line work and control data if the decompression buffer reaches a threshold.

51. The apparatus of claim 49, further comprising:
an eighth logic element which loads from the memory into the decompression buffer line work and control data from a new object after all the line work and control data from the object is decompressed and sent to the aligning logic.

52. The apparatus of claim 51, further comprising:
a ninth logic element which loads an additional object into the memory after buffering the new object in the decompression buffer.

53. The apparatus of claim 46, further comprising:
a fifth logic element which receives a request for data at a pixel position to align, wherein the line work and control data are not aligned if the pixel position for the line work and control data is not the same as the requested pixel position.

54. The apparatus of claim 53, wherein the buffer is a first buffer, and wherein line work and control data for four pixels are buffered in a second buffer comprising an aligning logic buffer to be aligned if the pixel position of the line work and control data for the first pixel of the four pixels is the same as the requested pixel position.

55. The apparatus of claim 54, wherein the control data is further capable of indicating to ignore or use the line work and control data for the object, further comprising:
a sixth logic element that loads data indicating a clipping region;
a seventh logic element that sets the control data for one pixel in the aligning logic buffer to indicate to ignore the line work and control data from the object if the location of the pixel is within the clipping region; and
and eighth logic element that sets the control data for one pixel in the aligning logic buffer to indicate to use the line work and control data from the object if the location of the pixel is not within the clipping region.

56. The apparatus of claim 46, wherein simultaneously aligning decompressed line work and control data is performed subsequent to completion of simultaneously decompressing line work and control data, and wherein buffering is performed subsequent to completion of simultaneously aligning the decompressed line work.

57. The apparatus of claim 56, wherein a decision on whether to ignore or use the line work and control data is based on a clipping region.

58. The apparatus of claim 56, further comprising a fifth logic element which sets the control data for one pixel to indicate to ignore the line work if the location of the pixel is within a clipping region, before aligning the line work and control data for the pixel.

59. The apparatus of claim 56, further comprising:
a fifth logic element which sets the control data for one pixel to indicate to use the line work and control data if the location of the pixel is not within the clipping region.

60. A method, comprising:
receiving line work data and control data for pixels on a sheet from objects, wherein control data for one pixel indicates whether to use the line work data for the pixel or contone data for the pixel, and wherein multiple objects may provide line work data and control data for a same pixel;
receiving a request for data at a pixel position to align, wherein the line work and control data are not aligned if the pixel position for the line work and control data is not the same as the requested pixel position, wherein line work and control data for a plurality of pixels are buffered in a first buffer comprising an aligning logic buffer to be aligned if the pixel position of the line work and control data for the first pixel of the plurality of pixels is the same as the requested pixel position;
performing the alignment of the line work and control data for the pixel based on a clipping region formed by information included in the control data;
simultaneously decompressing line work and control data for a same set of pixels from the multiple objects;
simultaneously aligning decompressed line work and control data for the same set of pixels from the multiple objects; and
buffering in a second buffer the simultaneously aligned line work and control data for the pixel from the multiple objects.

61. A system for processing pixel data, comprising:
means for receiving line work data and control data for pixels on a sheet from objects, wherein control data for one pixel indicates whether to use the line work data for the pixel or contone data for the pixel, and wherein multiple objects may provide line work data and control data for a same pixel;
means for receiving a request for data at a pixel position to align, wherein the line work and control data are not aligned if the pixel position for the line work and control data is not the same as the requested pixel position, wherein line work and control data for a plurality of pixels are buffered in a first buffer comprising an aligning logic buffer to be aligned if the pixel position of the line work and control data for the first pixel of the plurality of pixels is the same as the requested pixel position;
means for performing the alignment of the line work and control data for the pixel based on a clipping region formed by information included in the control data;
means for simultaneously decompressing line work and control data for a same set of pixels from the multiple objects;
means for simultaneously aligning decompressed line work and control data for the same set of pixels from the multiple objects; and
means for buffering in a second buffer the simultaneously aligned line work and control data for the pixel from the multiple objects.

62. Logic for processing pixel data that is capable of performing:
receiving line work data and control data for pixels on a sheet from objects, wherein control data for one pixel indicates whether to use the line work data for the pixel or contone data for the pixel, and wherein multiple objects may provide line work data and control data for a same pixel;
receiving a request for data at a pixel position to align, wherein the line work and control data are not aligned if the pixel position for the line work and control data is not the same as the requested pixel position, wherein line work and control data for a plurality of pixels are buffered in a first buffer comprising an aligning logic buffer to be aligned if the pixel position of the line work and control data for the first pixel of the plurality of pixels is the same as the requested pixel position; and
performing the alignment of the line work and control data for the pixel based on a clipping region formed by information included in the control data;
simultaneously decompressing line work and control data for a same set of pixels from the multiple objects;
simultaneously aligning decompressed line work and control data for the same set of pixels from the multiple objects; and
buffering in a second buffer the simultaneously aligned line work and control data for the pixel from the multiple objects.

63. Apparatus, comprising:
a first logic element which receives line work data and control data for pixels on a sheet from objects, wherein control data for one pixel indicates whether to use the line work data for the pixel or contone data for the pixel, and wherein multiple objects may provide line work data and control data for a same pixel;
a second logic element that receives a request for data at a pixel position to align, wherein the line work and control data are not aligned if the pixel position for the line work and control data is not the same as the requested pixel position, wherein line work and control data for a plurality of pixels are buffered in a first buffer comprising an aligning logic buffer to be aligned if the pixel position of the line work and control data for the first pixel of the plurality of pixels is the same as the requested pixel position;
a third logic element that performs the alignment of the line work and control data for the pixel based on a clipping region formed by information included in the control data;
a fourth logic element which simultaneously decompresses line work and control data for a same set of pixels from the multiple objects;
a fifth logic element which simultaneously aligns decompressed line work and control data for the same set of pixels from the multiple objects; and
a sixth logic element which buffers in a second buffer the simultaneously aligned line work and control data for the pixel from the multiple objects.

64. A method, comprising:
receiving line work data and control data for pixels on a sheet from objects, wherein control data for one pixel indicates whether to use or ignore the line work data for the pixel or contone data for the pixel, and wherein multiple objects may provide line work data and control data for a same pixel;

receiving a request for data at a pixel position to align, wherein line work and control data for a plurality of pixels are buffered in a first buffer comprising an aligning logic buffer to be aligned if the pixel position of the line work and control data for a first pixel of the plurality of pixels is the same as the requested pixel position;

loading data indicating a clipping region, and setting the control data for one pixel in the aligning logic buffer to use or ignore the line work and control data from the object based on whether the location of the pixel is within the clipping region;

simultaneously decompressing line work and control data for a same set of pixels from the multiple objects;

simultaneously aligning decompressed line work and control data for the same set of pixels from the multiple objects; and buffering in a second buffer the simultaneously aligned line work and control data for the pixel from the multiple objects.

65. A system, comprising:

means for receiving line work data and control data for pixels on a sheet from objects, wherein control data for one pixel indicates whether to use or ignore the line work data for the pixel or contone data for the pixel, and wherein multiple objects may provide line work data and control data for a same pixel;

means for receiving a request for data at a pixel position to align, wherein line work and control data for a plurality of pixels are buffered in a first buffer comprising an aligning logic buffer to be aligned if the pixel position of the line work and control data for a first pixel of the plurality of pixels is the same as the requested pixel position;

means for loading data indicating a clipping region, and setting the control data for one pixel in the aligning logic buffer to use or ignore the line work and control data from the object based on whether the location of the pixel is within the clipping region;

means for simultaneously decompressing line work and control data for a same set of pixels from the multiple objects;

means for simultaneously aligning decompressed line work and control data for the same set of pixels from the multiple objects; and means for buffering in a second buffer the simultaneously aligned line work and control data for the pixel from the multiple objects.

66. Logic for processing pixel data that is capable of performing:

receiving line work data and control data for pixels on a sheet from objects, wherein control data for one pixel indicates whether to use or ignore the line work data for the pixel or contone data for the pixel, and wherein multiple objects may provide line work data and control data for a same pixel;

receiving a request for data at a pixel position to align, wherein line work and control data for a plurality of pixels are buffered in a first buffer comprising an aligning logic buffer to be aligned if the pixel position of the line work and control data for a first pixel of the plurality of pixels is the same as the requested pixel position;

loading data indicating a clipping region, and setting the control data for one pixel in the aligning logic buffer to use or ignore the line work and control data from the object based on whether the location of the pixel is within the clipping region;

simultaneously decompressing line work and control data for a same set of pixels from the multiple objects;

simultaneously aligning decompressed line work and control data for the same set of pixels from the multiple objects; and buffering in a second buffer the simultaneously aligned line work and control data for the pixel from the multiple objects.

67. Apparatus, comprising:

first logic element which receives line work data and control data for pixels on a sheet from objects, wherein control data for one pixel indicates whether to use or ignore the line work data for the pixel or contone data for the pixel, and wherein multiple objects may provide line work data and control data for a same pixel;

second logic element which receives a request for data at a pixel position to align, wherein line work and control data for a plurality of pixels are buffered in a first buffer comprising an aligning logic buffer to be aligned if the pixel position of the line work and control data for a first pixel of the plurality of pixels is the same as the requested pixel position;

third logic element which loads data indicating a clipping region, and setting the control data for one pixel in the aligning logic buffer to use or ignore the line work and control data from the object based on whether the location of the pixel is within the clipping region;

fourth logic element which simultaneously decompresses line work and control data for a same set of pixels from the multiple objects;

fifth logic element which simultaneously aligns decompressed line work and control data for the same set of pixels from the multiple objects; and sixth logic element which buffers in a second buffer the simultaneously aligned line work and control data for the pixel from the multiple objects.

* * * * *

UNITED STATES PATENT AND TRADEMARK OFFICE
CERTIFICATE OF CORRECTION

PATENT NO. : 6,804,411 B1 Page 1 of 1
DATED : October 12, 2004
INVENTOR(S) : Stephen Dale Hanna It is certified that error appears in the above-identified patent and that said Letters Patent is hereby corrected as shown below:

Column 16,
Line 58, delete "29" and insert -- 32 --.

Signed and Sealed this

Twenty-seventh Day of December, 2005

JON W. DUDAS
*Director of the United States Patent and Trademark Office*